United States Patent Office 3,545,295
Patented Dec. 8, 1970

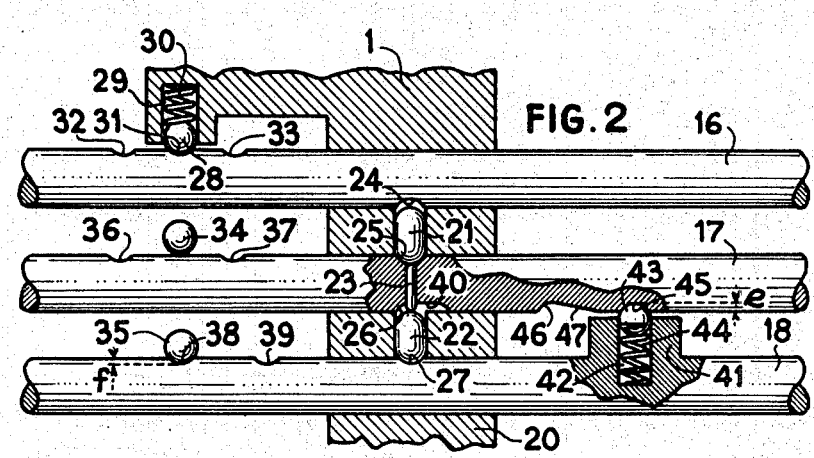
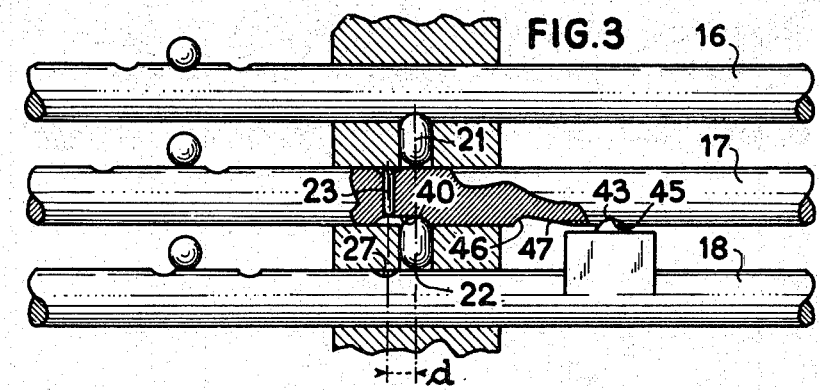
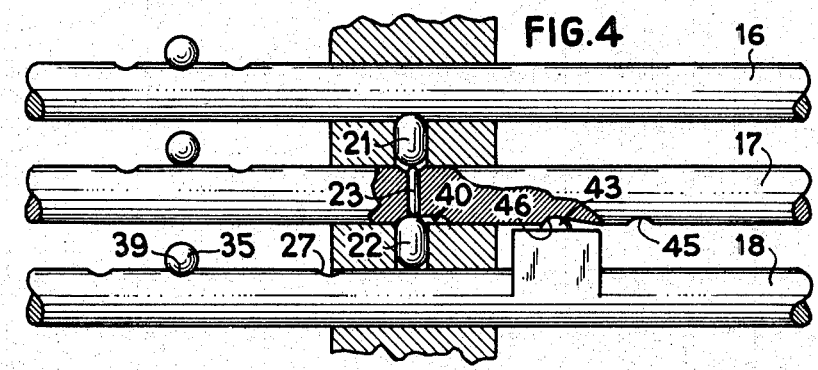

3,545,295
GEARBOX HAVING SYNCHRONIZERS AND AT LEAST ONE UNSYNCHRONIZED SPEED
Henri Ravello, Sochaux, France, assignor to Automobiles Peugeot, Paris, France, and Regie Nationale des Usines Renault, Billancourt, France, both French bodies corporate
Filed Oct. 31, 1968, Ser. No. 772,145
Claims priority, application France, Nov. 14, 1967, 128,034
Int. Cl. F16h *3/38;* G05g *5/10;* F6d *23/04*
U.S. Cl. 74—339
7 Claims

ABSTRACT OF THE DISCLOSURE

Gearbox having synchronizers but at least one speed unsynchronized, the synchronizers and the movable element for engaging the unsynchronized speed being actuated through parallel rods. The rod for the unsynchronized speed is connected to the rod of one of the synchronizers by automatically withdrawable unilateral connecting means which are such that the start of the movement of the unsynchronized speed rod from its position of rest automatically shifts the rod of said one of the synchronizers, this movement preceding the engagement of the unsynchronized speed and of such extent that it merely actuates said one of said synchronizers without engaging the corresponding speed.

---

The present invention relates to vehicle gearboxes of the type having synchronizers but at least one unsynchronized speed, generally the reverse speed, said synchronizers and the movable element for engaging the unsynchronized speed being actuated through longitudinally movable parallel rods.

It is known that with gearboxes of this type chattering of the teeth occurs, when the vehicle is stationary, in the course of the mutual engagement of relative toothed elements at the unsynchronized speed when the moving input assembly of the gearbox is still rotating under the effect of inertia or a parasitic drive.

The object of the invention is to provide a gearbox of the aforementioned type which is so improved as to remedy this drawback.

In the gearbox according to the invention, the unsynchronized speed engaging rod is connected to the rod of one of the synchronizers through unilateral connecting means which are automatically withdrawable and such that the start of the movement from its position of rest of the rod pertaining to the unsynchronized speed automatically shifts the rod connected to said synchronizer, said movement, which precedes the engagement of the unsynchronized speed, being of such extent that it merely puts into action the synchronizer without engaging the corresponding speed.

By being put into action, the synchronizer interconnects the driving part and the driven part of the gearbox. Now, as the driven part is stationary, since the vehicle is stationary, the synchronizer therefore stops the driving part if the latter is rotating for any reason. A continuation of the movement of the rod pertaining to the unsynchronized speed then permits the chatter-free engagement of the latter.

Owing to the different speeds of rotation of the moving parts of the various synchronizers, due to the gear ratios, and owing to the dimensions of the synchronizers, the synchronizer which will have maximum efficiency is usually that of the highest gear ratio (fourth speed in the case of a four-speed gearbox. However, if design considerations so require, any other synchronizer can be employed.

Further features and advantages of the invention will be apparent from the ensuing description with reference to the accompanying drawings.

In the drawings:

FIG. 2 is a diagrammatic view of the three rods actuating the forks with the device for locking and putting them out of action and the unilateral connecting means, the assembly being shown in the neutral position;

FIG. 3 shows the same rods at the start of the engagement of the reverse speed;

FIG. 4 is a view identical to FIG. 2 after engagement of the reverse speed, and

Figure 1:
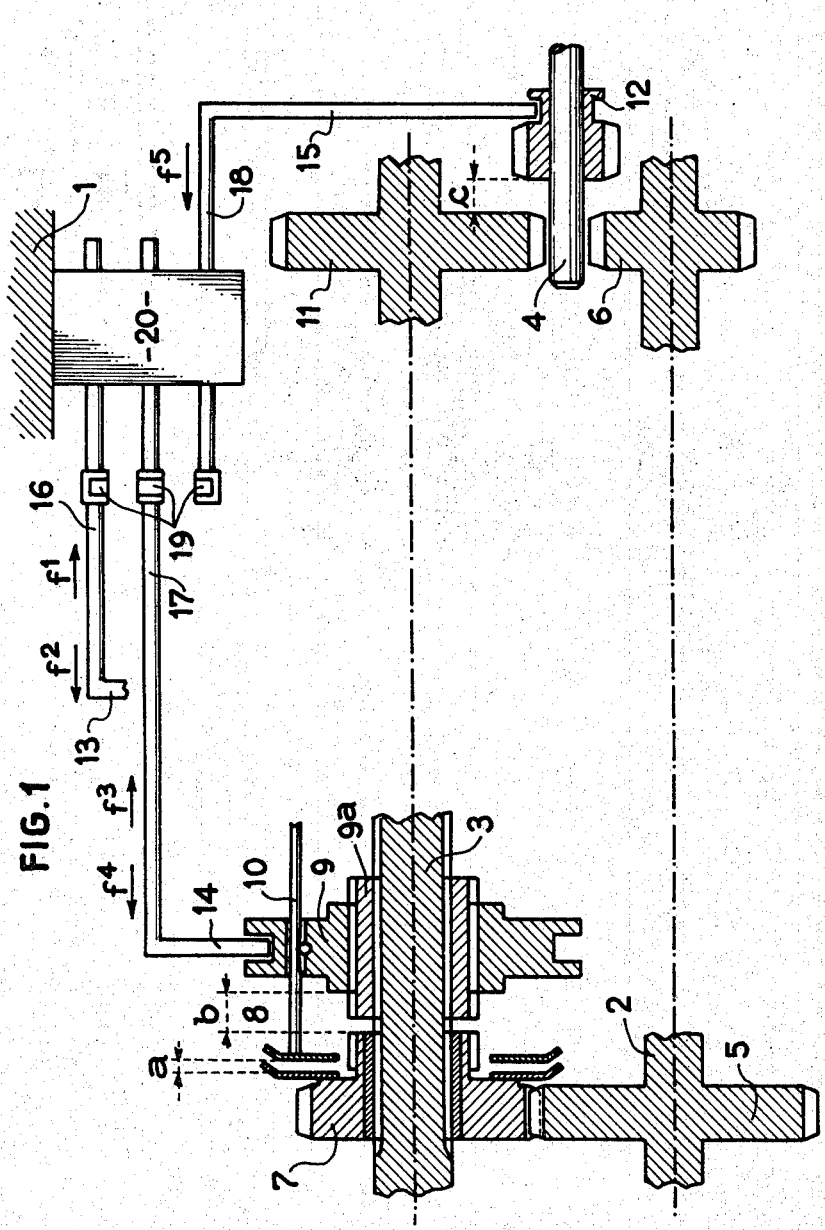
FIG. 1 is a diagrammatic sectional view of the parts of a gearbox according to the invention.

Reference will first be had to FIG. 1 in which the invention is shown to be applied to a gearbox having four forward speeds ande one reverse speed. Only a small part of the case 1 of this gearbox has been shown. Journalled in this case are the primary or input shaft 2, the output shaft 3 which is stationary when the vehicle or other machine is stationary, and the intermediate shaft 4 of the reverse speed. Only the gear 5 of the fourth speed and the gear 6 of the reverse speed have been shown on the primary shaft 2, these gears being connected to rotate with this shaft.

The gear 5 can be connected through the gear 7 with which it is meshed and which is freely rotatable on the shaft 3 to the synchronizer 8 and then to the sliding gear 9 of the fourth and third speeds which is slidably keyed on a hub 9a, keyed to the shaft 3, and co-operates with the synchronizer 8 through a rod 10 which permits the axial meshing of the teeth of the sliding gear 9 with those of the gear 7 only when the sliding gear 9 and the shaft 3 have reached, under the action of the synchronizer 8, the same speed as the constantly driven gear 7.

With regard to the reverse speed gear 6, it can be connected to the gear 11 integral with the output shaft 3 through an intermediate sliding gear 12.

In FIG. 1:

$a$ represents the travel for engaging the synchronizer 8;

$b$ represents the travel of the start of the axial meshing of the gear teeth of the fourth speed;

$c$ represents the travel of the start of the axial meshing of the reverse speed.

It is required that $b>a$ and $c>a$ and there is obtained for example $b>c>a$.

The sliding gear (not shown) of the second and third speeds, the sliding gear 9 of the fourth and third speeds, and the sliding gear 12 of the reverse speed, are controlled in the known manner by respective forks 13, 14 and 15 which are connected to move in translation with three parallel rods 16, 17 and 18 the movements of which, indicated by the arrows $f^1$, $f^2$, $f^3$, $f^4$ and $f^5$, respectively correspond to the engagements of the first, second, third and fourth speeds and the reverse speed. They slide transversely in appropriate guides formed in the part 20 of the case 1 of the gearbox, devices for locking and rendering them inoperative ensuring the positioning. The locking device precludes actuation of two of the three rods when the third has been shifted for engaging a speed and consists in the known manner of bolts 21 and 22 (FIG. 2) which are a slide fit in the part 20 of the case 1, an interlocking pin 23 freely sliding in a transverse aperture formed inthe rod 17. These bolts engage in corresponding recesses 24, 25, 26, 27 in the rods.

The dimensions of the bolts 21 and 22 and of the needle 23 relative to the dimensions of the rods 16–18 and to their centre distance are such that it is only possible to shift one rod at a time.

The detent device of the rod 16 of the first and second speeds comprises in the known manner a ball 28 disposed in a recess 29 integral with the case 1 and a spring 30 which bears against the end of said recess and applies the ball against the rod 16 where it engages in one of three recesses 31, 32 or 33. Recess 31 corresponds to the neutral position, recess 32 to the first speed and recess 33 to the second speed.

As concerns the other two rods, the detent device also comprises balls 34 and 35 mounted in the same way as the ball 28. However, in order to simplify the drawing, only the balls have been shown. The ball 34 is engageable in a recess 36 when the third speed is engaged or in a recess 37 when the second speed is engaged. In respect of this ball, no recess exists for maintaining the fork rod in the neutral position.

The ball 35 is engageable in a recess 38 when the reverse speed rod 128 is in the neutral position or in a recess 39 when the reverse speed is engaged.

The known assembly described hereinbefore is completed in accordance with the invention in the following way:

The recess 26 of the rod 17 of the third and fourth speeds is enlarged toward the right at 40 so that it is possible, as will be seen hereinafter, to shift the rod 16 of the fourth and third speed slightly towards the left an extent $d$ when the reverse speed is to be engaged.

The length $d$ is less than the travels $b$ and $c$ of the start of the axial meshing of the sliding gears 9 and 12 of the fourth and reverse speed but greater than the travel $a$ of the fourth speed synchronizer, so that:

$b > c > d > a$ (FIG. 5) if $b > c$, as is the case in this example.

A boss 41 on the rod 18 of the reverse speed permits accommodating in a cavity 42 a ball 43 which is biased by a spring 44 against the third and fourth speed rods 17.

When the two rods 17 and 18 are in the neutral position, the ball 43 is engaged in a recess 45 of the rod 17.

The depth $e$ of this recess 45 is less than the depth $f$ of the recess 38 and the shapes of these recesses are such that the locking by the ball 35 is stronger than that achieved by the ball 43.

An asymmetric recess 46 having a ramp 47, whose purpose will be explained hereinafter, is formed in the rod 17 so that ball 43 engages therein when the reverse speed is engaged.

The assembly operates in the following manner:

With the vehicle stationary and the output shaft 3 stationary, to engage the reverse speed, the rod 18 is shifted to the left by forcing the ball 35 out of its recess 38 and urging the bolt 22, the needle 23 and the bolt 21 upwardly (FIG. 3) thus locking the rod 16 but not the rod 17 owing to the widening of the recess 26 at 40.

Under these conditions, the rod 17 is also shifted to the left by the ball 43 until the bolt 22 abuts the end of the recess 40 (FIG. 3).

As the corresponding travel $d$ of the simultaneous movement of the rods 18 and 17 has been chosen to be greater than the travel $a$ necessary for bringing the synchronizer 8 of the fourth speed into action but less than the travels $b$ and $c$ corresponding to the start of the axial meshing of the sliding gear 9 of the fourth speed and the sliding gear 12 of the reverse speed, the coming into action of the synchronizer 8 of the fourth speed at A (see FIG. 5 where the line PM represents the neutral point and the lines $m$ $n$ and $p$ $q$ the lines of movement of the rods 17 and 18) then ensures if need be that the whole of the moving assembly 2, 5, 6, 7 is held stationary by the connection thereof with the stationary shaft 3 and this permits the start of the engagement of the reverse speed at C with no risk of chattering. In continuing the shifting of the rod 8 to the left after the travel $d$, the rod 17 being in abutmentt with the bolt 22 (FIG. 3), the ball 43 is expelled from its recess 45 and then bears against the ramp 47 of the recess 46 and causes the return of the rod 17 to the neutral position.

Simultaneously the engagement of the reverse speed is achieved and the rod 18 is locked by the ball 35 engaging the recess 39 (see FIG. 4).

It should be mentioned that the ramp 47 is not essential to good operation of the device. Indeed, during operation of the reverse speed, which is usually employed for a limited period of time, the synchronizer 8 of the fourth speed has no driving force to transmit and return to the neutral position is not essential.

Figure 5:
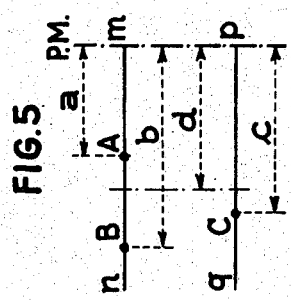
FIG. 5 is a graph showing the relative values of the critical travels of the fourth speed and reverse speed rods.

To engage the third or fourth speed, the rod 17 is shifted to the right or to the left, but as the locking afforded by the ball 35 is stronger than that afforded by the ball 43 there is no risk of the rod 18 being shifted. If it is the third speed which is engaged, the cancelling of the two other rods 16 and 18 is achieved normally right from the start of the travel by the bolts 21 and 22. If it is the fourth speed which is engaged, the rod 16 is put out of action immediately by the bolt 21 whereas the rod 18 is put out of action only when the rod 17, after having travelled through the extent $d$, expels the bolt 22 from the recess 23, the start of the axial intermeshing of gears 7 and 9 occurring only at B (FIG. 5).

In other words, the locking of the rod 18 is only effected after synchronization of the fourth speed. In any case, safety is ensured since, if the reverse speed fork 15 were shifted, for example owing to the release of the pressure of the ball 35, engagement of the fourth speed would be impossible since the lock 22 can no longer be withdrawn.

To engage the first or second speed, there is no change in the conventional operation, the rods 17 and 18 being put out of action immediately by the bolts 21 and 22.

Although a specific embodiment of the invention has been described, many modifications and changes may be made therein without departing from the scope of the invention.

Having now described my invention what I claim as new and desire to secure by Letters Patent is:

1. A gearbox comprising an input shaft and an output shaft, a forward input gear integral with said input shaft, a forward output gear rotatably mounted on said output shaft and constantly meshing with said forward input gear, synchronizer means slidably mounted on said output shaft and rotatable therewith, said synchronizer means including clutch means and positive coupling means which are adapted to engage successively said forward output gear after respective travels $a$ and $b$, first actuating means for shifting said synchronizer means toward or away from said forward output gear, a reverse input gear integral with said output shaft, an auxiliary shaft, a reverse sliding gear freely mounted on said auxiliary shaft, second actuating means for shifting said reverse sliding gear over a travel $c$, into meshing engagement with said reverse input and output gears, detent means between said first and second actuating means for coupling said first actuating means to said second actuating means during movement thereof for shifting said reverse sliding gear into engagement with said reverse input and output gears, and further means for stopping said first actuating means and disengage said detent means after a travel $d$, which is greater than travel $a$ but less than travels $b$ and $c$.

2. A gearbox as claimed in claim 1, wherein said first actuating means comprises a first longitudinally movable shift rod and said second actuating means comprises a second longitudinally movable shift rod parallel to said first shift rod, said detent means comprising a first recess defined in one of said rods, a spring-loaded ball in said recess, protruding at the periphery of said one of said rods and engaging the other of said rods, and a second recess defined in said other rod to accommodate said spring-loaded ball.

3. A gearbox as claimed in claim 2, comprising a locking device between said second shift rod of said second actuating means and said first shift rod of said first actuating means for locking one of the two shift rods when the other is shifted and vice-versa, said device having a bolt, said first shift rod having a recess for receiving said locking bolt, said recess having a longitudinal extent which slightly exceeds the travel $a$ of said first shift rod for engaging said clutch means of said synchronizer means with said forward output gear.

4. A gearbox as claimed in claim 2, wherein the shift rod of said second actuating means is provided with elastically yieldable means for holding it stationary in its neutral position and in its reverse speed position, said detent means being less powerful than said elastically yieldable means.

5. A gearbox as claimed in claim 2, comprising further means for automatically urging the shift rod of said first actuating means back towards its neutral position, after having brought into action said clutch means of said synchronizer means and upon continuation of the movement of the shift rod of the second actuating means to the position of engagement of the said reverse sliding gear.

6. A gearbox as claimed in claim 2, wherein the shift rod of said first actuating means defines a ramp located axially adjacent said second recess for said ball, said ramp returning said shift rod under the action of said ball to its neutral position after it has travelled over said travel $d$.

7. A gearbox as claimed in claim 1, wherein said synchronizer means is that pertaining to the top speed of the gearbox.

References Cited
UNITED STATES PATENTS

| | | | |
|---|---|---|---|
| 2,362,925 | 11/1944 | Peterson et al. | 74—477 |
| 2,847,871 | 8/1958 | Schick | 74—477 |
| 3,115,048 | 12/1963 | Cape | 74—363X |
| 3,192,788 | 7/1965 | Fodrea | 74—475X |
| 3,301,078 | 1/1967 | Michael | 74—477X |
| 2,627,956 | 2/1953 | Perkins | 192—53 |
| 3,386,302 | 6/1968 | Ivanchich | 74—339 |

ARTHUR T. McKEON, Primary Examiner

U.S. Cl. X.R.

74—477; 192—53